United States Patent [19]

Takei

[11] Patent Number: 5,326,335
[45] Date of Patent: Jul. 5, 1994

[54] DRIVE APPARATUS

[75] Inventor: Seiji Takei, Kanagawa, Japan

[73] Assignee: Nippon Thompson Co., Ltd., Tokyo, Japan

[21] Appl. No.: 995,157

[22] Filed: Dec. 22, 1992

[30] Foreign Application Priority Data

Dec. 25, 1991 [JP] Japan .................................. 3-356443

[51] Int. Cl.⁵ .......................... F16H 19/02; B23Q 1/18
[52] U.S. Cl. ..................................... 476/67; 33/1 M;
74/89; 74/479 PH; 104/165; 108/20; 108/143; 384/45
[58] Field of Search ............. 74/479 PH, 89; 33/1 M;
108/20, 137, 143; 248/184, 657, 661; 269/71, 73; 359/393; 414/749; 384/45; 476/8, 67; 104/165; 105/30

[56] References Cited

U.S. PATENT DOCUMENTS

| | | | |
|---|---|---|---|
| 3,598,740 | 8/1971 | Duling et al. ................. | 476/8 X |
| 4,274,801 | 6/1981 | Herb et al. .................... | 414/749 X |
| 4,750,970 | 6/1988 | Malosh ......................... | 248/661 X |
| 5,040,431 | 8/1991 | Sakino et al. ................. | 74/479 PH |
| 5,207,115 | 5/1993 | Takei ............................. | 248/184 X |

FOREIGN PATENT DOCUMENTS

2-24032  1/1990  Japan ................................... 108/143

*Primary Examiner*—Allan D. Herrmann
*Attorney, Agent, or Firm*—Sughrue, Mion, Zinn, Macpeak & Seas

[57] ABSTRACT

The present invention provides a drive apparatus that is compact in size, low in cost, allows the attaining of a high degree of accuracy as well as high-speed driving, suppresses the production of noise, and demonstrates favorable ease of assembly when incorporating within machine tools and so on. The present invention is able to obtain the effects of reduction of costs, high accuracy and high-speed driving as a result providing a torque generation device on a slider guided by a track rail, attaching a drive roller to the output shaft of the torque generation device, and said drive roller rolling along the track rail. In addition, the above-mentioned effect of improved ease of assembly is obtained by attaching the torque generation device facing horizontally on the side of the slider.

8 Claims, 12 Drawing Sheets

DRIVE APPARATUS

BACKGROUND OF THE INVENTION

1. Field of the Invention

The present invention relates to a drive apparatus for moving a certain object (driven object) in a desired direction.

2. Description of the Prior Art

An example of the prior art having this type of drive apparatus is the XY table indicated in FIG. 1.

As indicated in FIG. 1, said XY table is comprised of X table 1 installed on the floor or a mounting frame in a workshop, and Y table 2 moved by said X table 1. Furthermore, as X table 1 and Y table 2 mutually have nearly the same constitution, the following detailed explanation will be provided with respect to X table 1 only, with an explanation of Y table 2 omitted. However, those constituent members of Y table 2 that correspond to the constituent members of X table 1 are indicated using the same reference numerals. Furthermore, an exploded view of the constituent members of X table 1 divided into suitable blocks is indicated in FIG. 2.

As indicated in FIG. 1, X table 1 has a long, roughly rectangular plate-shaped base 5, and side plate 6, provided on said base 5 and forming a box with said base 5. Motor 7 is mounted on one end of this side plate 6. In addition, as is indicated in FIG. 2, pulley 9 is fit onto output shaft 7a of motor 7. In addition, another pulley 10 is arranged on base 5, and is mounted to base 5 by means of brackets not shown. Endless belt 12 is wrapped around pulleys 9 and 10. A driven object in the form of moving table 13 is fastened to this belt 12.

As indicated in the drawings, moving table 13 has a prescribed thickness and is composed to be of a size that allows it to be contained within the width of side plate 6. Two table projections 13a projecting above the upper surface of side plate 6 are provided in parallel on the left and right sides. These table projections 13a may be formed into an integrated structure with moving table 13 or may be composed in the form of separate structures. Above-mentioned Y table 2 is mounted on the upper surface of said table projections. Furthermore, cover 15 is arranged to the inside of these table projections 13a, acting to prevent entrance of dust and so on.

A driving device that drives belt 12 is comprised of the above-mentioned motor 7, pulley 9 and pulley 10.

On the other hand, as is indicated in FIG. 2, a pair of linear motion rolling guide units 17 are mutually arranged in parallel on the right and left sides of the above-mentioned belt 12, and are mounted on base 5. These linear motion rolling guide units 17 receive the load in all four directions (the directions indicated by arrows Z and Y as well as their respective opposite directions) applied to moving table 13, and also act as guiding devices that guide moving table 13. The driving apparatus that moves moving table 13, the driven object, is composed of these linear motion rolling guide units 17 and the above-mentioned belt 12 and its driving device.

More specifically, linear motion rolling guide unit 17 is composed of track rail 18, roughly in the shape of a square column, in which ball track rail groove 18a, having a cross-section in the shape of a semi-circle, is formed in the left and right shoulders of the side wall, slider 20, having a cross-section roughly in the shape of the letter "U", in which ball track rail groove 20a, having a semicircular cross-section, is formed in its inner surface in opposition to ball track rail groove 18a of track rail 18, and flat plate-shaped retainers (not shown), arranged at equal intervals in the mutual sliding direction between ball track rail grooves 18a and 20a, and holding the balls while allowing rotation. Furthermore, linear motion rolling guide units 17 are not limited to the use of balls, but may also use other devices such as rollers as long as they are of a constitution that uses a rolling object.

The following provides an explanation of the operation of the XY table having the above-mentioned constitution. Furthermore, as X table 1 and Y table 2 have the same constitution as described above, the following explanation will deal primarily with X table 1.

Firstly, when a power voltage is supplied to motor 7 of X table 1, output shaft 7a of motor 7, serving as the driving source, rotates which transmits torque to pulley 9. Then, belt 12, wrapped around pulley 9 and pulley 10, is driven in a prescribed direction, and moving table 13, mounted on the upper surface of this belt 12, also moves guided by linear motion rolling guide unit 17. Conversely, when the direction of rotation of motor 7 is reversed, belt 12 is driven in the opposite direction from that above, and consequently, moving table 13 also moves in that direction. In addition, the movement of moving table 13 is controlled by a control circuit composed of a microcomputer and so on. A detector, which outputs a position detection signal to this control circuit, is composed to be able to be mounted to the inside of side plate 6 indicated in FIG. 1, and on the upper surface of base 5. In addition, detection may also be performed by an encoder mounted behind motor 7.

In addition, since Y table 2 is mounted on table projections 13a of moving table 13 equipped on X table 1, it moves in the X direction which is the same direction as moving table 13 of X table 1. As moving table 13 of Y table 2 is composed so as to be able to independently move linearly in the Y direction, by controlling these with a control circuit not shown, moving table 13 of Y table 2 can be moved in both the X and Y directions.

The drive apparatus shown in FIG. 3 as a second example of a drive apparatus of the prior art can be incorporated into the XY table indicated in FIG. 1 in the same manner as the drive apparatus indicated in FIG. 2 as a first example of the prior art.

As indicated in FIG. 3, said drive apparatus has long ball screw 26, provided in parallel with track rail 18 equipped with linear motion rolling guide unit 17, and attached at both ends to base 5 by means of bearings 25, motor 27 that rotates said ball screw 26, and nut member 28 engaging with ball screw 26 and mounted with respect to moving table 13, the driven object.

Furthermore, since the drive apparatus indicated in FIG. 3 is composed in the same manner as the first example of a drive apparatus of the prior art indicated in FIG. 2 with respect to portions other than those described above, an explanation of the entire apparatus will be omitted. In addition, in the above-mentioned explanation, the same reference numerals are used for those constituents that are identical to the constituents equipped on the first example of the prior art. In said second example of a drive apparatus of the prior art, when ball screw 26 is driven to rotate by motor 27, moving table 13 moves together with nut member 28.

As described above, in addition to linear motion rolling guide unit 17 for guiding of the driven object, the drive apparatus of the prior art has a long component for transmission of driving force such as belt 12 or ball screw 26, motors 7 and 27 that serve as the driving source, and several other peripheral components, such as pulleys and bearings, related to these. Accordingly, this drive apparatus has the shortcomings of being large in size and having a large number of components resulting in high costs. In addition, since the driving force produced by motors 7 and 27, serving as the driving sources, is transmitted through numerous members, such as a long component for transmission of driving force, this drive apparatus has the additional shortcoming of it being difficult to attain a high degree of accuracy in movement and positioning of the driven object. Moreover, together with it not always being easy to attain high-speed driving with this drive apparatus, due to the large number of components operating relative to each other, this drive apparatus has the shortcoming of producing a relatively high level of noise.

SUMMARY OF THE INVENTION

In consideration of the above-mentioned shortcomings of the prior art, the object of the present invention is to provide a drive apparatus that is compact in size, low in cost, allows the attaining of a high degree of accuracy as well as high-speed driving, suppresses the production of noise, and demonstrates favorable ease of assembly when incorporating within machine tools and so on.

The present invention comprises: a track rail having a track formed along the axial direction, and a mounting surface on its bottom for mounting onto a prescribed frame; a slider guided by the above-mentioned track; a torque generation device mounted on the side of the above-mentioned slider so that the output shaft is roughly perpendicular to the above-mentioned axial direction and roughly parallel with the above-mentioned mounting surface; and, a drive roller that is driven to roll while engaging with the above-mentioned track rail by application of torque by the output shaft of the above-mentioned torque generation device.

DESCRIPTION OF THE PREFERRED EMBODIMENTS

The following provides a detailed explanation of a drive apparatus in the form of embodiments of the present invention with reference to the attached drawings.

Firstly, FIGS. 4 through 8 indicate a drive apparatus as a first embodiment of the present invention.

Figure 1:
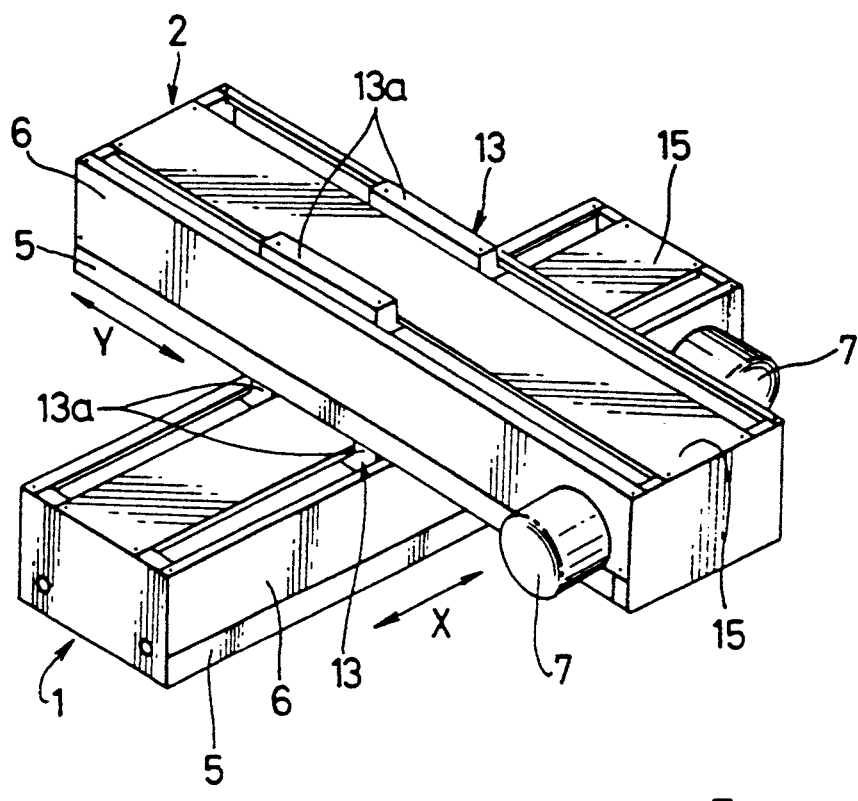
FIG. 1 is a perspective view of an XY table equipped with an example of a drive apparatus of the prior art.
Figure 2:
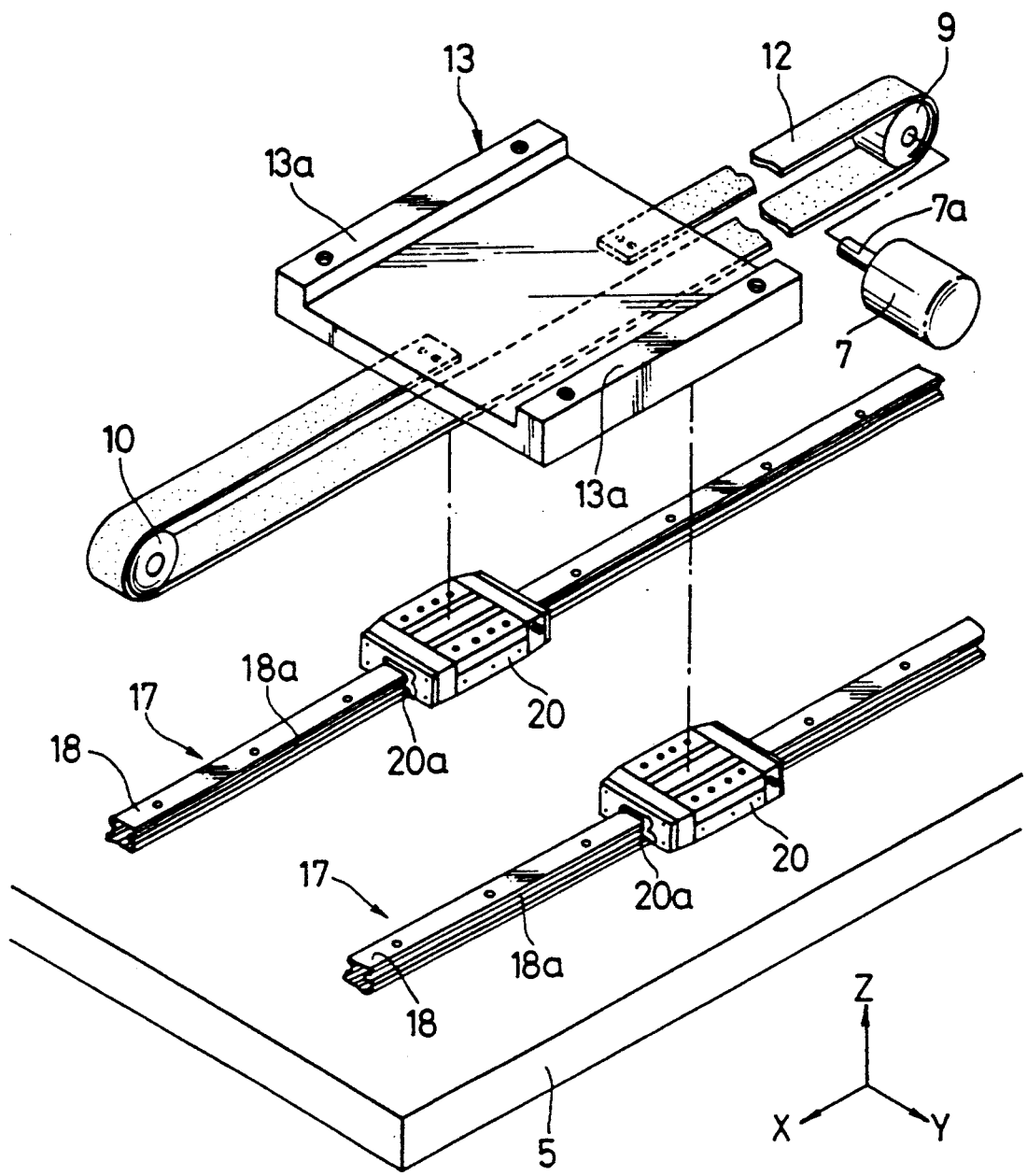
FIG. 2 is an exploded perspective view of a drive apparatus containing the XY table indicated in FIG. 1.
Figure 3:
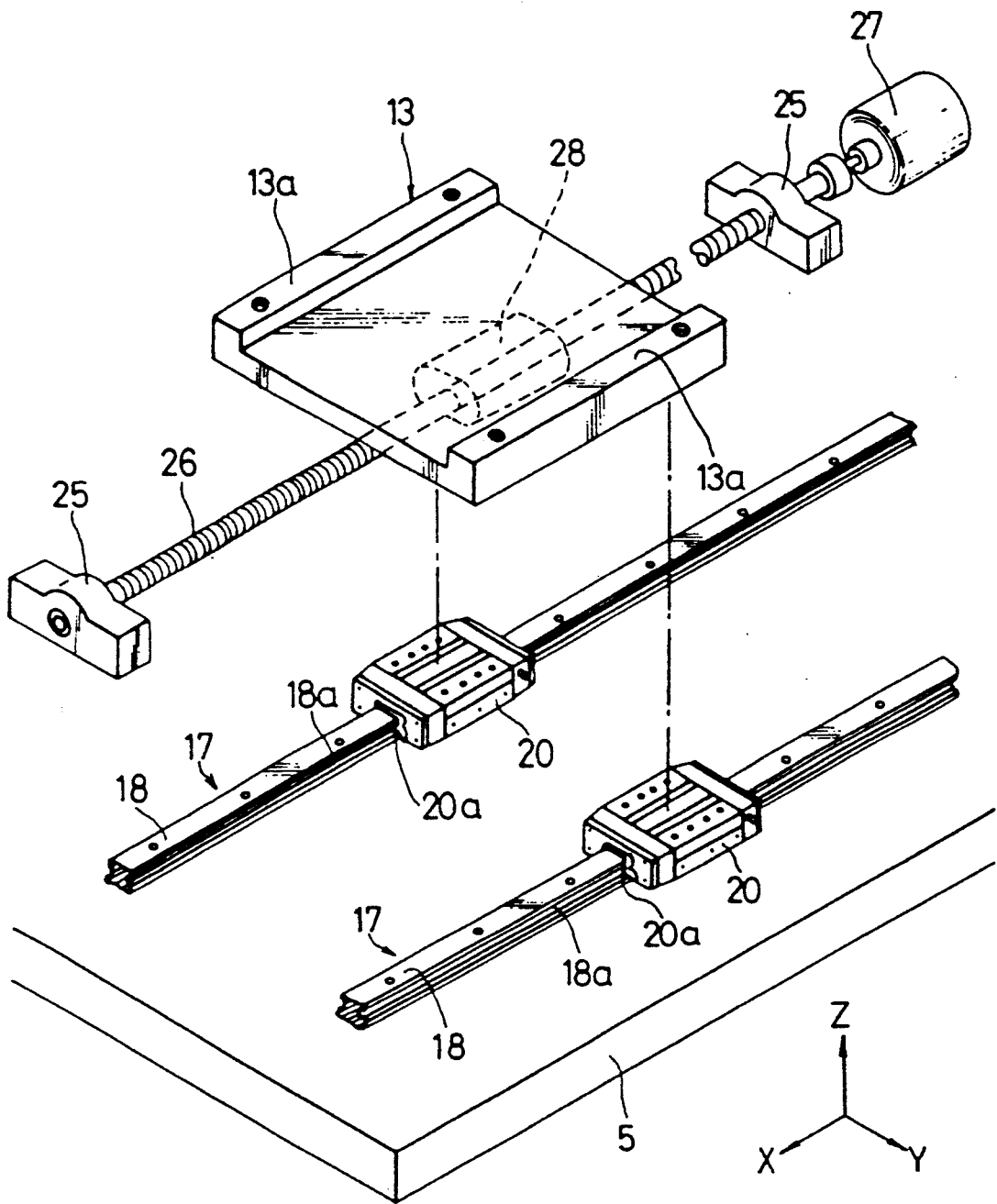
FIG. 3 is an exploded perspective view of a second example of a drive apparatus of the prior art.
Figure 4:
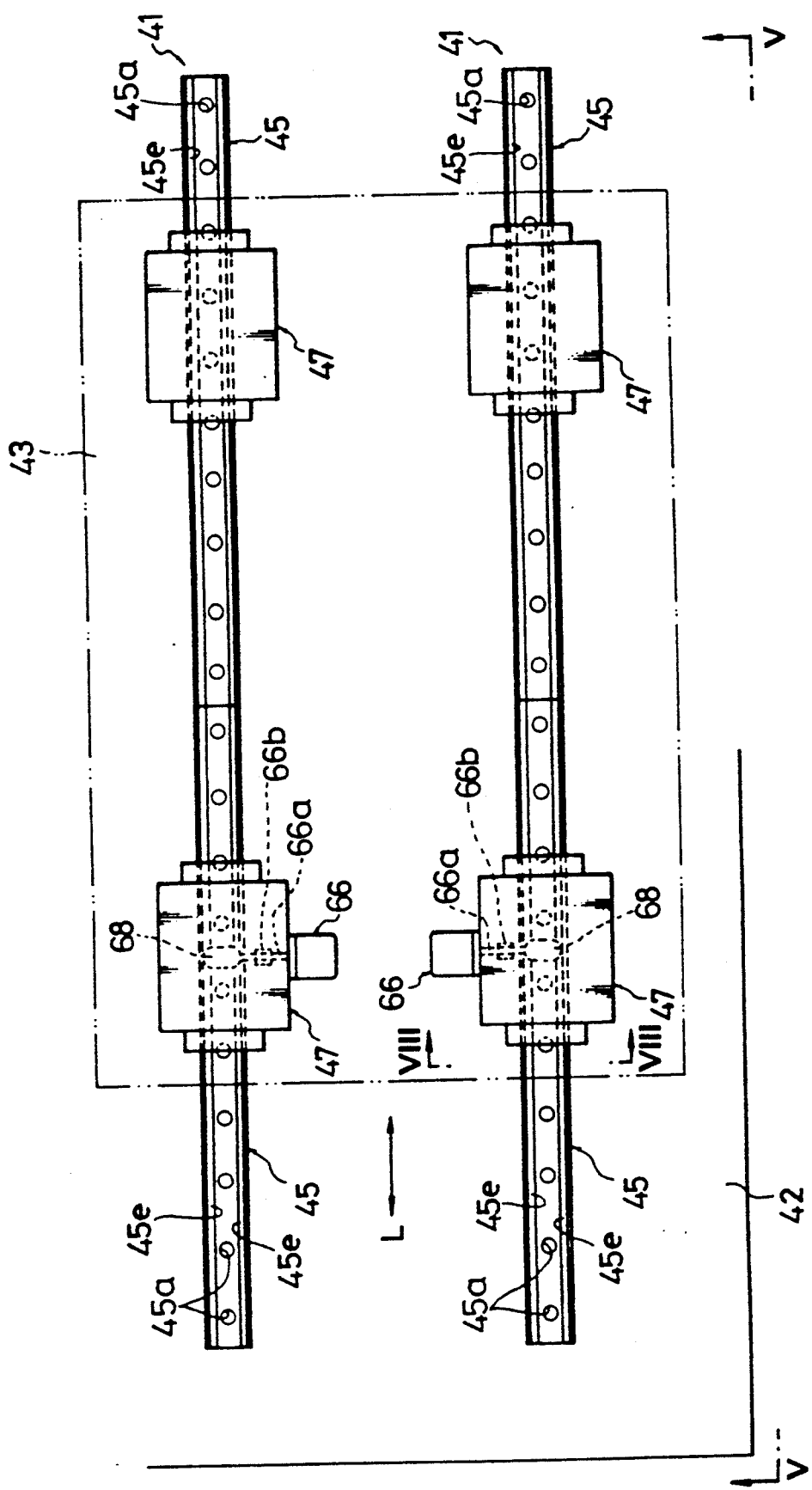
FIG. 4 is an overhead view indicating the drive apparatus of a first embodiment of the present invention mounted on the bed of a machine tool.
Figure 5:
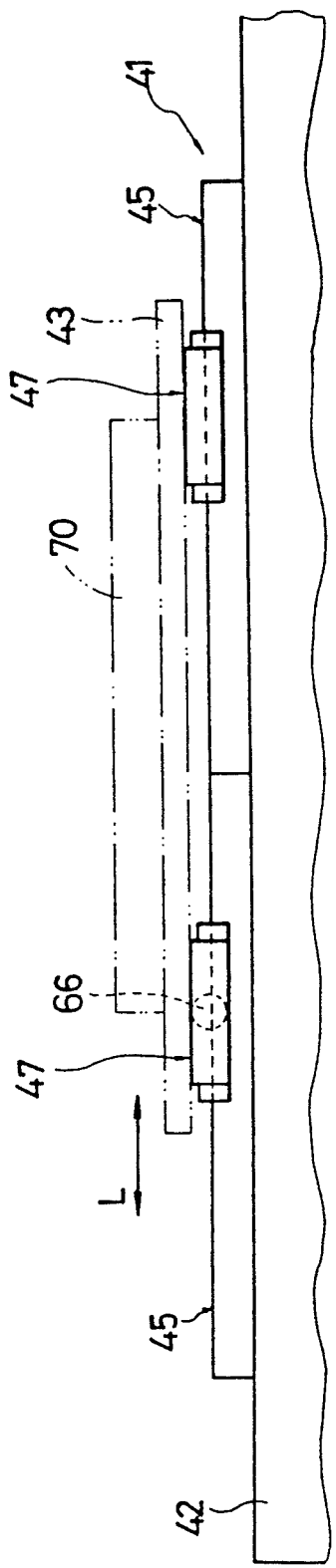
FIG. 5 is a view taken along arrows V—V relating to FIG. 4.

In FIGS. 4 and 5, two sets of this drive apparatus 41 are provided in parallel on a frame in the form of bed 42 of a machine tool (the entire machine tool is not shown), and support and move in concert with table 43.

Figure 6:
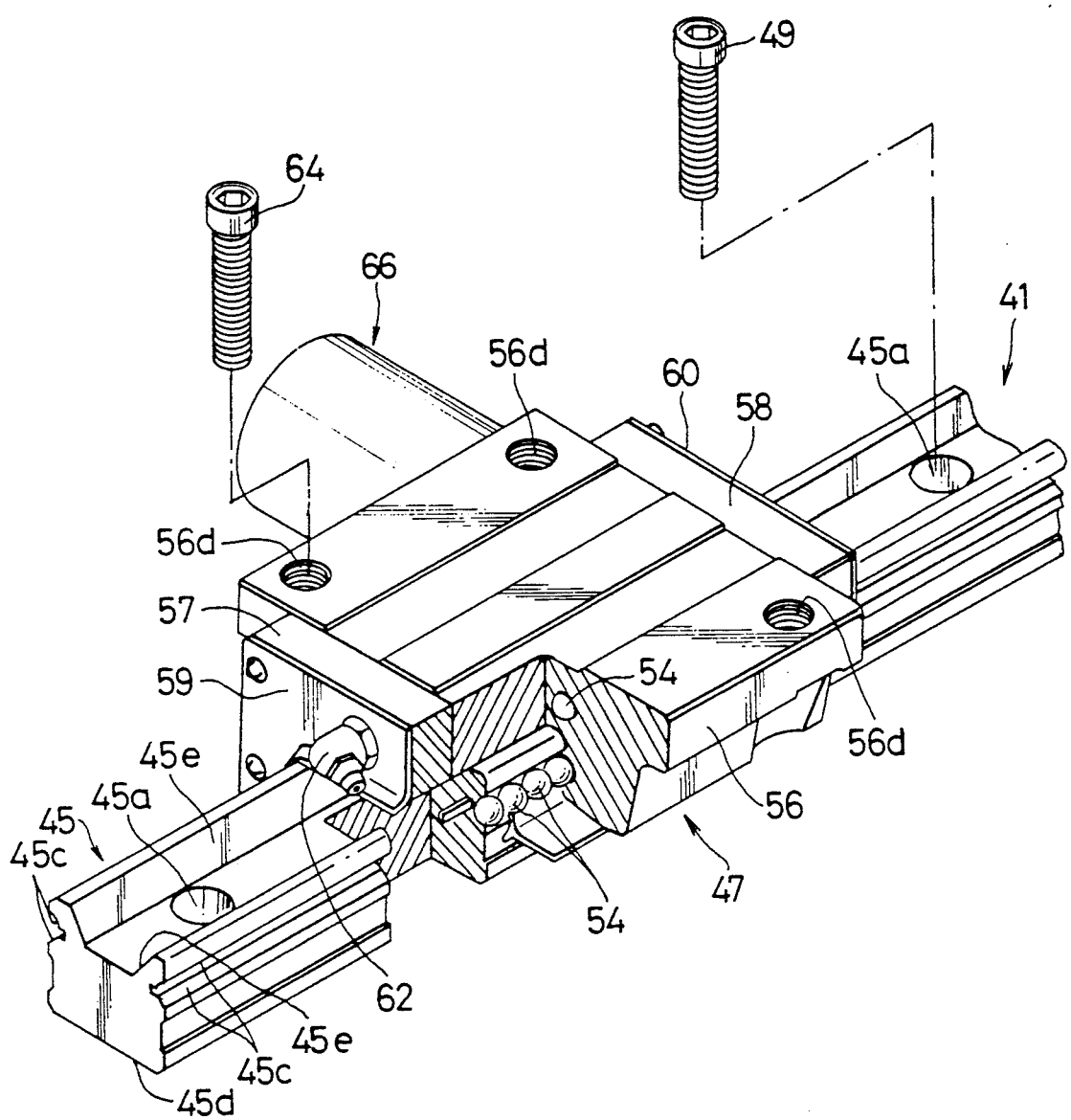
FIG. 6 is a perspective view, including a partial cross-section, of the drive apparatus indicated in FIG. 4 and FIG. 5.

Both drive apparatuses 41 have two linear track rails 45 mounted in a single row on bed 42, and two slide units 47 in the form of sliding units that are guided by said track rails 45. Furthermore, as indicated in FIG. 6, each track rail 45 is fastened to bed 42 by a plurality of bolts (with hexagon sockets) 49. More specifically, as is clearly indicated in FIGS. 7 and 8 in particular, countersunk portions 45a, having a diameter slightly larger than the heads of bolts 49 for fastening said track rail 45 to bed 42, and insertion holes 45b, having a diameter slightly larger than the threaded portions of bolts 49, are formed concentrically in track rail 45. Bolts 49 are screwed into bed 42 by being inserted into said countersunk portions and insertion holes so that they are completely embedded beneath the surface of said bed 42.

Figure 7:
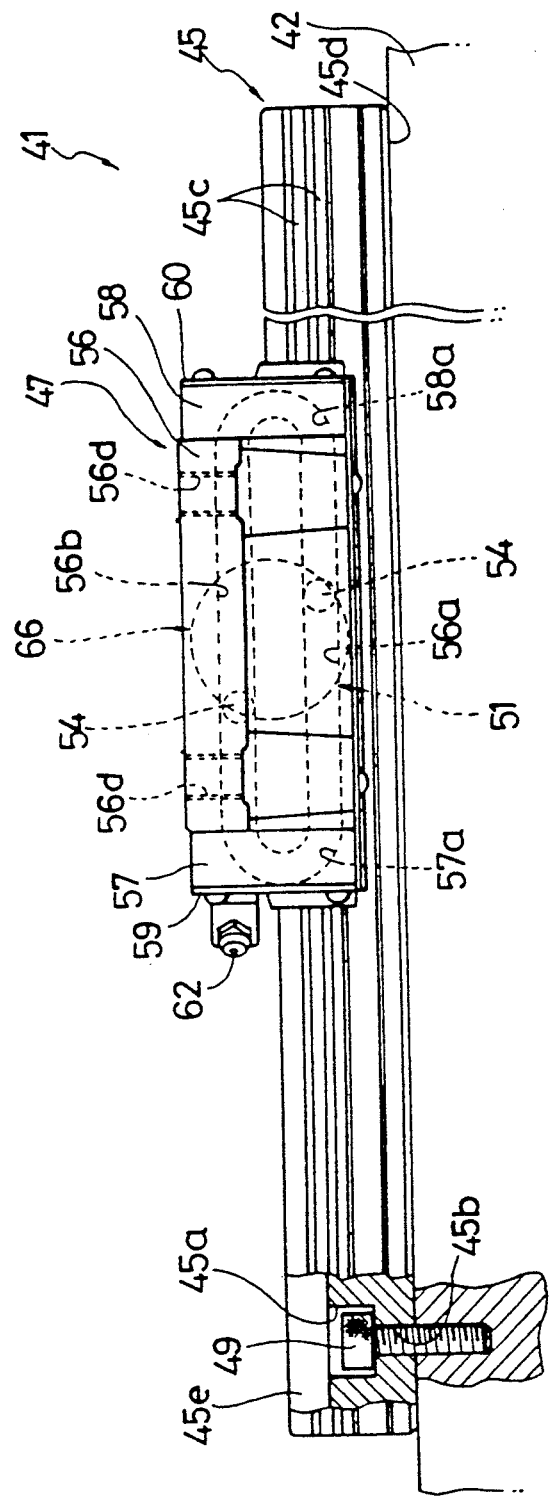
FIG. 7 is a side view, including a partial cross-section, of the essential components of the drive apparatus indicated in FIG. 4 and FIG. 5.
Figure 8:
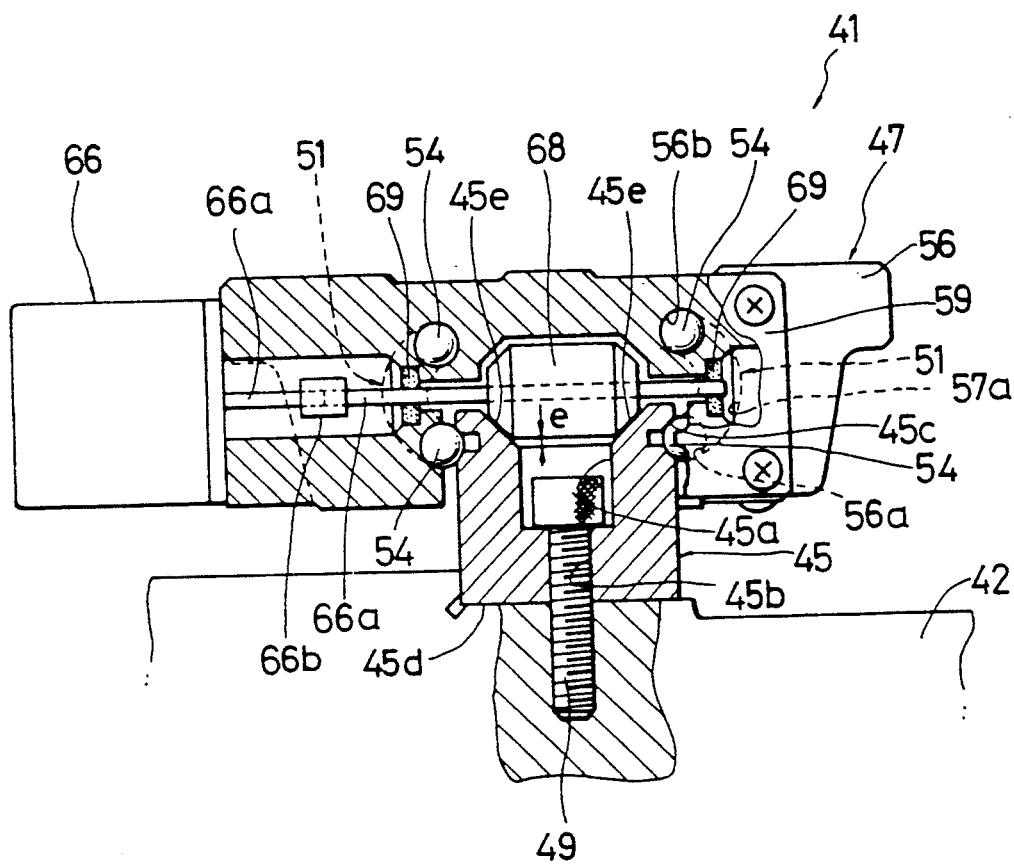
FIG. 8 is a view taken along arrows VIII—VIII including a partial cross-section, relating to FIG. 4.

As is indicated in FIGS. 6 through 8, track rail 45 has a total of two tracks in the form of track grooves 45c, located on both sides of said track rail 45, that are formed along the axial direction of said track rail 45 having a cross-sections in the shape of a semi-circle. In addition, track rail 45 also has a flat mounting surface on its bottom for fastening to bed 42. Slide unit 47 is straddled across this track rail 45, and as indicated in FIGS. 7 and 8, has two internal rolling element circulating paths 51 corresponding to each of the above-mentioned track grooves 45c. A plurality of rolling elements in the form of balls 54 are arranged and contained within these rolling element circulating paths 51. Each ball 54 rolls over track groove 45c accompanying movement of slide unit 47, thus resulting in circulation. As indicated in the drawings, slide unit 47 has casing 56, a pair of end plates 57 and 58 coupled to both the front and back ends of said housing 56, and two end seals 59 and 60 attached to the outside surface of said each end plate. Above-mentioned rolling element circulating path 51 is composed of load bearing track groove 56a and return path 56b, each formed linearly and in parallel with casing 56, and a pair of roughly semi-circular directional change paths 57a formed in both end plates 57 and 58 that connect the above-mentioned load bearing track groove 56a and return path 56b at both of these ends. Furthermore, a grease nipple 62 is attached on end plate 57 for supplying grease to the surface of the above-mentioned balls 54. In addition, as indicated in FIGS. 6 and 7, a plurality of threaded holes 56d are formed in the upper side, or in other words the supporting side, of casing 56 of slide unit 47. Table 3, indicated in FIGS. 4 and 5, is then fastened to said casing 56 by bolts (with hexagon sockets) 64 screwed into these threaded holes.

However, as indicated in FIGS. 4 through 8, motor 66 is mounted as a torque generating device in the center of the side of casing 56 of slide unit 47. This motor 66 is attached so that its output shaft 66a is perpendicular to the axial direction of track rail 45, and parallel to mounting surface 45d of said track rail 45. As a result of motor 66 being attached in this manner, said drive apparatus demonstrates favorable ease of assembly during incorporation into a machine tool and so on.

In other words, as an example of a form that is different from said constitution, motor 66 can also be attached to the upper side of casing 56 with output shaft 66a facing downward. However, when arranged in this manner, through holes for insertion of motor 66 into table 43 must be provided so that motor 66 and table 43 do not interfere with each other since table 43 is attached to the upper surface of casing 56. However, this results in poor assembly characteristics due to an increase in the amount of processing required for forming the through holes. In addition, in this type of constitution, since a portion of motor 66 protrudes above the surface of table 43, this obstructs the placement of workpieces and so on to be described later on said table 43. The drive apparatus pertaining to the present invention eliminates this risk by employing a constitution like that described above.

As indicated in FIG. 8, output shaft 66a of motor 66 protrudes into the internal space of casing 56 through the through hole formed in said casing 56 of slide unit 47. Cylindrical drive roller 68 then fits onto this protruding portion. Furthermore, this drive roller 68 is also shown in FIG. 4. In addition, as indicated in FIG. 8, output shaft 66a is supported by casing 56 by means of two bearings 69 in the form of ball bearings, oil-less bearings and so on. In addition, output shaft 66a is separated roughly in its middle, with both separated portions connected by coupling 66b. Centering can be performed easily, and attachment and removal of motor 66 is simplified as a result of having this constitution.

On the other hand, as is indicated in FIG. 4, FIG. 6 and FIG. 7, two flat track surfaces 45e are formed on the top of track rail 45 in parallel with track grooves 45c equipped on said track rail 45 to allow rolling by engaging with the above-mentioned drive roller 68. More specifically, a groove, having a roughly trapezoidal cross-section, is formed in the top of track rail 45, and the inclined surfaces on the left and right sides of this groove form track surfaces 45e. Thus, since this constitution allows drive roller 68 to roll across the inclined surfaces of the groove in the form of track surfaces 45e, drive roller 68 is able to roll smoothly and free of obstruction without making contact with countersunk portion 45a formed in track rail 45 for insertion of bolts.

A prescribed amount of oil is constantly supplied to the above-mentioned track surfaces 45e. Accordingly, an oil film (not shown) is formed between drive roller 68 and said track surfaces 45e. Consequently, slide unit 47 is propelled by means of the resistance, or in other words traction, that occurs when the oil film is sheared by the rotation of drive roller 68. Furthermore, although a traction drive system is employed in the subject embodiment, a so-called friction drive system may also be employed in which drive roller 68 and track surfaces 45e are brought in contact with each other without providing an oil film. In addition, traction drive or friction drive systems may also be employed in the drive apparatuses of other embodiments to be described later.

In the drive apparatus having the constitution described above, when motor 66 operates with workpiece 70, etc., placed and fastened on table 43 as indicated in FIG. 5, drive roller 68 rolls over track surfaces 45e. Accordingly, table 43 moves either back or forth as in the manner indicated with arrow L together with each slide unit 47 that support said table 43. The desired processing, such as cutting and so on, is then performed on workpiece 70, etc., accompanying this movement.

Figure 9:
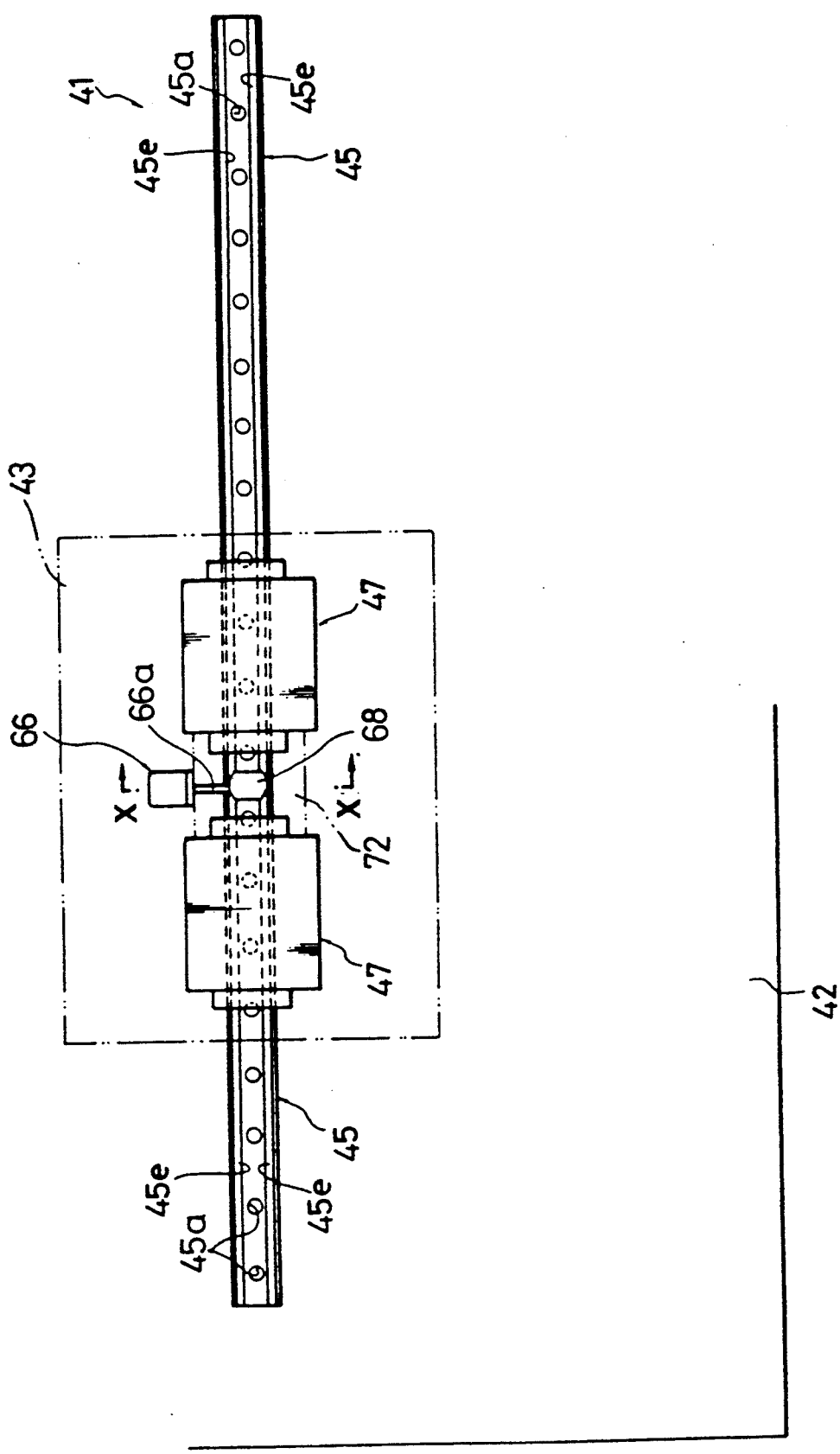
FIG. 9 is an overhead view indicating the drive apparatus of a second embodiment of the present invention mounted on the bed of a machine tool.
Figure 10:
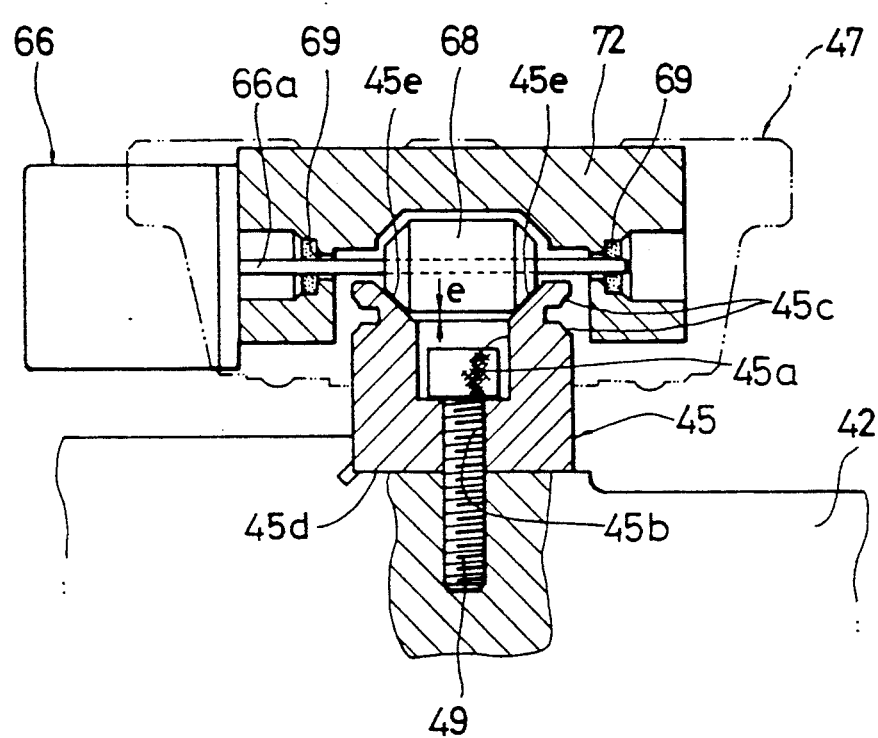
FIG. 10 is a view taken along arrows X—X relating to FIG. 9.

FIGS. 9 and 10 indicate the essential components of the drive apparatus of a second embodiment of the present invention. Furthermore, since the drive apparatus pertaining to this second embodiment is composed similar to the drive apparatus of the first embodiment indicated in FIGS. 4 through 8 with the exception of the essential components explained below, an explanation of this entire drive apparatus has been omitted. In addition, in the explanation provided below, the same reference numerals are used for those members that are either identical or correspond to constituent members of the drive apparatus of the first embodiment.

As indicated in FIGS. 9 and 10 of the subject drive apparatus, a plurality of slide units 47, in the form of two sliders arranged in a row in this case, are coupled into a single unit by coupling member 72 having a cross-section in the shape of the letter "U". Motor 66 is mounted on the side of this coupling member 72, and output shaft 66a of said motor is inserted into a through hole formed in said coupling member 72. Furthermore, output shaft 66a is supported by coupling member 72 by means of two bearings 69 consisting of ball bearings, oil-less bearings and so on.

Figure 11:
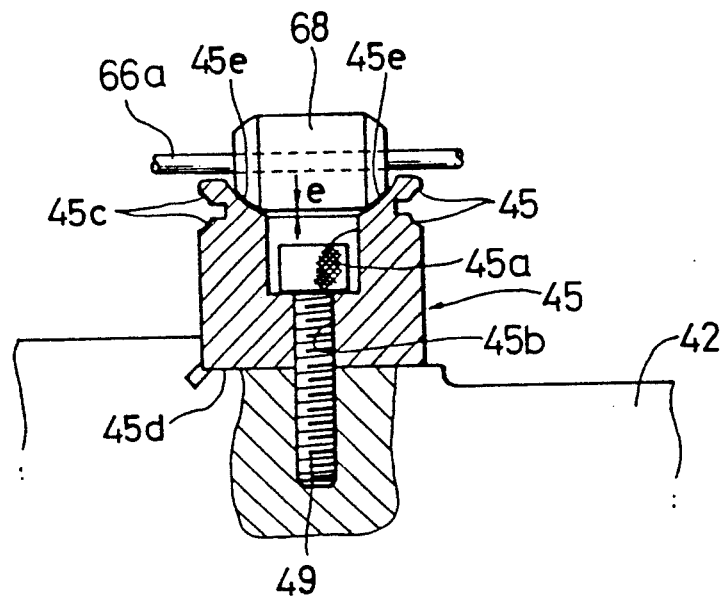
FIG. 11 is a vertical cross-sectional view indicating a variation of the track rail and drive roller equipped on each of the drive apparatuses indicated in FIGS. 4 through 10.
Figure 12:
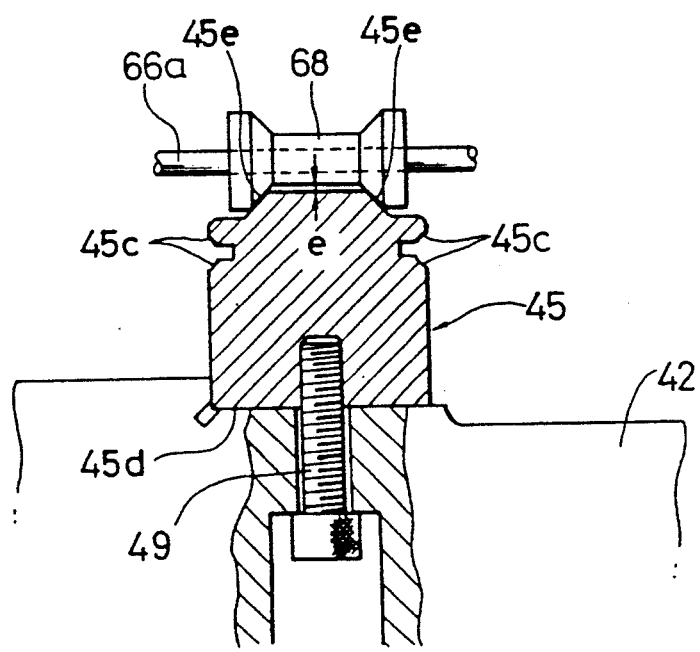
FIG. 12 is a vertical cross-sectional view indicating a variation of the track rail and drive roller equipped on each of the drive apparatuses indicated in FIGS. 4 through 10.
Figure 13:
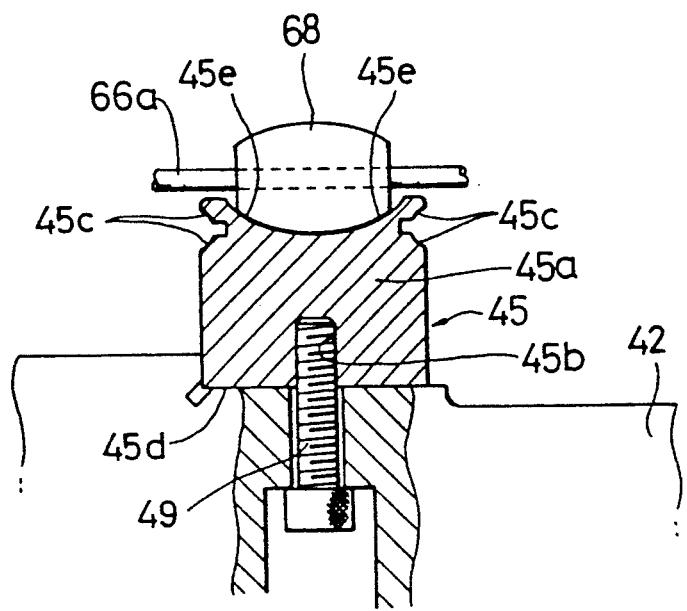
FIG. 13 is a vertical cross-sectional view indicating a variation of the track rail and drive roller equipped on each of the drive apparatuses indicated in FIGS. 4 through 10.
Figure 14:
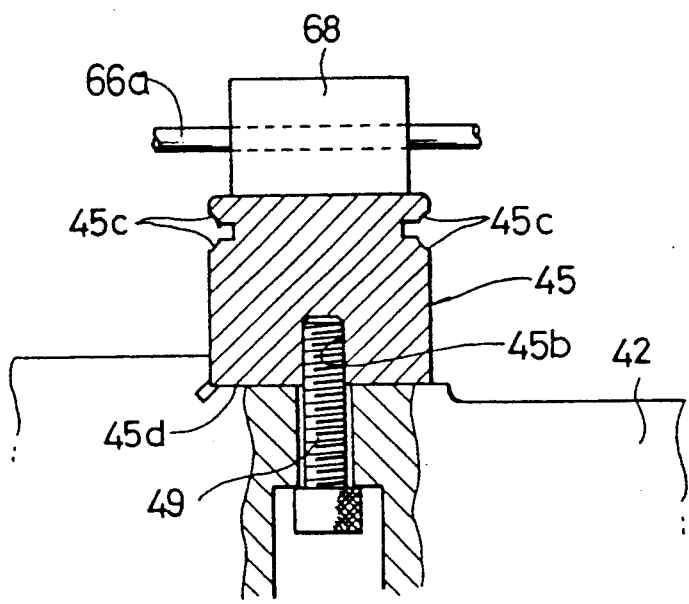
FIG. 14 is a vertical cross-sectional view indicating a variation of the track rail and drive roller equipped on each of the drive apparatuses indicated in FIGS. 4 through 10.

Furthermore, in each of the above-mentioned embodiments, although track surfaces 45e of track rail 45 and the engaging surfaces of drive roller 68 are both flat, as indicated in FIG. 11, both of these surfaces may also be curved. In addition, although the drive apparatuses of each of the above-mentioned embodiments are such that the outside surface of drive roller 68 fits into the concave portion formed in track rail 45 to provide track surfaces 45e, conversely, as indicated in FIG. 12, this may be of a constitution in which drive roller 68 is given a concave shape and track rail 45 is given a convex shape so that both constituents fit together. In this case, bolts 49 are screwed in from the bottom side of bed 42. Moreover, although gap e is provided between the outside surface of drive roller 68 and track rail 45 in each of the above-mentioned embodiments, a constitution may be employed in which a gap is not formed between these two constituents as indicated in FIGS. 13 and 14.

In addition, since drive roller 68 shown in each of the embodiments has a flat or curved tapered surface on both ends, a large amount of thrust can be obtained since said drive roller 68 engaging with track rail 45 by means of said tapered surfaces.

Moreover, in each of the above-mentioned embodiments, although each drive apparatus 41 is equipped with one motor 66 and one drive roller 68 each, there are no limitations on the number of these constituents.

In addition, in each of the above-mentioned embodiments, although motor 66 and drive 68 are provided on one of the two slide units 47 moving on the same track rail 45, said motor 66 and drive roller 68 can be mounted on both slide units 47, and each slide unit 47 can then be driven individually. In this case, each slide unit 47 supports separate tables. Furthermore, casing 56 itself of slide unit 47 can be used as a table.

In addition, it goes without saying that the present invention is not limited to the above-mentioned first and second embodiments, but can realize a diverse range of constitutions by suitably combining the constitutions of each embodiment. In addition, in each of the above-mentioned embodiments, although balls 54 circulate within slide unit 47 accompanying movement of said slide unit 47, said embodiments are not limited to said constitution, but other constitutions may naturally be applied as well. Moreover, although balls 54 are used in each of the embodiments, a constitution may be employed using columnar or cylindrical rollers, etc.

Moreover, although the case of using motor 66 for the torque generation device is indicated in each of the above-mentioned embodiments, various other torque generation devices, such as that combining a motor and a speed reduction mechanism, can also be applied.

Finally, although drive roller 68 is directly attached to output shaft 66a of motor 66 in each of the above-mentioned embodiments, a constitution may be employed in which drive roller 68 is attached to casing 56, and a speed reduction mechanism, etc., is installed between said drive roller 68 and motor 66.

According to the present invention as described above, since driving of a slider is performed by a torque generation device installed to have a compact form, the present invention offers the first advantage of allowing the overall size of the drive apparatus to be reduced.

In addition, since the above-mentioned driving is only the result of directly engaging a track rail and a drive roller to which torque is applied by the output shaft of a torque generation device, a member for transmitting driving force is not required resulting in reduced costs, thereby offering the second advantage of the present invention.

Moreover, since a driving force transmission member is not provided between he drive roller and track rail as indicated above, in comparison with apparatuses of the prior art in which driving force is transmitted through numerous driving force transmission members, movement of the driven object and positioning accuracy, which are effected by the number of components and manufacturing accuracy, is dramatically improved thereby resulting in the third advantage of the present invention.

In addition, since the total weight of moving components consisting of the slider and torque generation device is small, together with it being easy for the drive apparatus of the present invention to achieve high-speed driving, since the number of components operating relative to each other is also low, the present invention offers the fourth advantage of allowing suppression of the level of noise.

In addition, in the drive apparatus according to the present invention, the torque generation device is mounted on the side of the slider so that its output shaft is roughly perpendicular to the axial direction of the track rail and roughly parallel to the bottom mounting surface of the track rail. As a result of having said constitution, said drive apparatus offers favorable ease of assembly when incorporating into machine tools and so on.

As an example of a different form of the constitution of the subject present invention, the torque generation device can be attached to the upper side of the slider with its output shaft facing downward. However, in the case of a constitution of this type, since a table for holding a workpiece, etc., is attached to the top of the slider, through holes for insertion of the torque generation device must be provided in said table so that the torque generation device does not interfere with said table, etc. This results in poor ease of assembly due to an increase in the amount of processing and so on. In addition, in the case of this type of constitution, since a portion of the torque generation device protrudes above the surface of said table, etc., this obstructs the placement of a workpiece on said table, etc. In the drive apparatus pertaining to the present invention, this risk is eliminated as a result of employing a constitution like that described above.

What is claimed is:

1. A drive apparatus comprising:
   a track rail having formed along an axial direction thereof, and a mounting surface on a bottom thereof for mounting onto a prescribed frame;
   a slider guided by said track;
   a torque generation device mounted on a side of said slider so that an output shaft thereof is roughly perpendicular to said axial direction and roughly parallel with said mounting surface;
   a drive roller that is driven to roll while engaging with said track rail by application of torque via the output shaft of said torque generation device; and
   means for supporting said slider with respect to said track rail, said means substantially eliminating static load on said driver roller.

2. The drive apparatus of claim 1, wherein an oil film is formed between said track rail and said drive roller.

3. The drive apparatus of claim 1, wherein said drive roller is in contact with said track rail.

4. The drive apparatus of claim 1, wherein track surfaces over which said drive roller is to roll, are formed in said track rail parallel to said track.

5. The drive apparatus of claim 1, wherein a plurality of said sliders are provided on said track rail, each of said sliders being coupled into a single unit, and said torque generation device and said driver roller being arranged between said sliders.

6. The drive apparatus of claim 1, wherein a plurality of said sliders are provided on said track rail, and said torque generation device and said drive roller are arranged on each slider.

7. A drive apparatus comprising:
   a track rail having a track formed along an axial direction thereof, and a mounting surface on a bottom thereof for mounting onto a frame;
   a pair of sliders guided by said track;
   a torque generation device arranged between said sliders and having an output shaft arranged roughly perpendicular to said axial direction;
   a drive roller coupled to said output shaft and driven to roll while engaging with said track rail by application of torque via said output shaft; and
   means for supporting at least one of said sliders, said means substantially eliminating static load on said drive roller.

8. A drive apparatus comprising:

a track rail having a track formed along an axial direction thereof, and a mounting surface on a bottom thereof for mounting onto a frame;
a pair of sliders guided by said track;
a torque generation device mounted on a side of each of said sliders and each having output shafts roughly perpendicular to said axial direction;
each of said output shafts being coupled to a drive roller driven to roll while engaging with said track rail by application of torque via said output shafts of said torque generation devices; and
means for supporting at least one of said sliders, said means substantially eliminating static load on said drive roller.

* * * * *